United States Patent [19]
Ogawa et al.

[11] Patent Number: 5,881,997
[45] Date of Patent: Mar. 16, 1999

[54] METAL DIAPHRAGM TYPE VALVE

[75] Inventors: Shuhei Ogawa; Kazuhiro Yoshikawa, both of Osaka, Japan

[73] Assignee: Fujikin Incorporated, Osaka, Japan

[21] Appl. No.: 976,639

[22] Filed: Nov. 24, 1997

[51] Int. Cl.$^6$ ................................................. F16K 31/44
[52] U.S. Cl. ..................................... 251/335.2; 251/335.1
[58] Field of Search .............................. 251/335.1, 335.2

[56] References Cited

U.S. PATENT DOCUMENTS

| | | | |
|---|---|---|---|
| 4,671,490 | 6/1987 | Kolenc et al. | 251/335.2 |
| 4,732,363 | 3/1988 | Kolenc et al. | 251/335.2 |
| 4,750,709 | 6/1988 | Kolenc et al. | 251/355.2 |
| 5,624,102 | 4/1997 | Nishimura et al. | 251/335.2 |
| 5,743,513 | 4/1998 | Yoshikawa et al. | 251/335.2 |

*Primary Examiner*—A. Michael Chambers
*Attorney, Agent, or Firm*—Griffin, Butler, Whisenhunt & Szipl, LLP

[57] ABSTRACT

A metal diaphragm type valve includes a valve seat holder supported from a rotatable valve stem, a metal diaphragm and a deflection limiter. The valve seat holder has a shaft extending upwardly through central openings in the diaphragm and the deflection limiter. A diaphragm support step having an annular flat surface joining an arcuate shoulder is provided around the shaft of the valve seat holder and the inner peripheral edge of the diaphragm rests on the flat surface. The deflection limiter has a flat bottom surface facing the top surface of the diaphragm and an arcuate surface extends radially outwardly from the flat bottom surface. The deflection limiter, diaphragm and valve seat holder are welded together by a weld extending through the flat bottom portion of the deflection limiter and the inner peripheral edge of the diaphragm to the flat surface on the seat holder, the weld forming an air-tight seal between the valve chamber and the passage for the shaft. The radial dimensions of the flat surfaces are different so that bending stresses occur in different regions of the diaphragm depending on whether the valve is opened or closed.

5 Claims, 8 Drawing Sheets

METAL DIAPHRAGM TYPE VALVE

FIELD OF THE INVENTION

This invention relates to a metal diaphragm type valve suitable for use in a fluid conveying line of, for example, a semiconductor manufacturing plant. More particularly, the invention relates to a seal structure providing a seal between the inner peripheral edge of the metal diaphragm and a seat holder extending through the diaphragm so as to result in a minimum space in which a fluid may be trapped, and distribution of bending stresses in different regions of the diaphragm depending on whether the valve is opened or closed.

BACKGROUND OF THE INVENTION

In the manufacture of semiconductors it is frequently necessary to supply precise volumes of different fluids, say gases, to a treatment chamber, the fluids being conveyed to the treatment chamber in sequence through a fluid feed line controlled by a diaphragm valve. Typically, a first fluid is applied to the treatment chamber through the feed line after which a purge fluid is applied to the feed line to purge any traces of the first fluid. After purging, the second fluid is then applied to the chamber through the feed line.

During the purging operation it is desirable to remove as much as possible of the first fluid in the feed line and valve so that the first fluid will not contaminate the second fluid. To accomplish this, the valve interior should have no gaps, crevices or 'dead air spaces' within the chamber where fluid may be caught or trapped so that it is not purged from the valve during the purging operation. As the degree of integration of semiconductors increases, there is a corresponding demand for increased fluid purity and only a very slight amount of fluid trapped in a crevice has a serious effect on the quality of the semiconductor product, and increases the frequency of defective pieces.

In metal diaphragm valves, a crevice which traps fluid and prevents complete purging is frequently found where the metal diaphragm is mounted on a seat holder which extends through the diaphragm.

FIGS. 6 and 7 illustrate a seal structure as disclosed in U.S. Pat. No. 4,750,709 for sealing the inner peripheral edge of a diaphragm in a metal diaphragm type valve to a seat holder. The end portion of the inner peripheral edge of a diaphragm 40 is welded by a weld 80 to a eat holder 78, and an inner peripheral edge portion of the diaphragm, spaced from the weld 80 by distance D, is gripped and supported between the lower surface of a presser 82 and the upper surface of the seat holder 78 at a region 94, thereby preventing a bending stress from being applied to the weld 80 at the time of operation of the diaphragm.

In FIGS. 6 and 7, reference numeral 100 is a body, 100a is a valve chamber, 100b is a valve seat, 100c is a fluid passage, 50 is a bonnet, 160 is a seat, 88 is a stem, 86 is a screw formed at the lower end of the stem and 94 is a gripping region.

The valve disclosed in U.S. Pat. No. 4,750,709, and shown in FIGS. 6 and 7 has several disadvantages. Since the diaphragm 40 is gripped at region 94 spaced by a distance D from weld zone 80, and is supported between the lower surface of the annular presser 82 and the seat holder 78 whose entire upper surface is formed to have a curvature, a deep annular gap Go is formed between the lower surface of the diaphragm and the upper surface of the seat holder. As a result, fluid is likely to be caught in the gap so that it is not easily purged during cleaning of the valve. Accordingly, in this valve the so-called replacement or purging performance of fluids is inferior.

Moreover, since a screw structure 86 is utilized to clamp the diaphragm between seat holder 78 and the presser 82, the screw tightening may be loosened over a long course of use, and in such a case the gripping and supporting of the inner peripheral edge of the diaphragm 40 may be released. As a result, up and down movement of the seat holder 78 causes a large bending stress to be applied to the weld zone 80. This may lead to the formation of cracks in the inner peripheral edge of the diaphragm.

Further, since the diaphragm 40 is gripped in the position or region 94 spaced outwardly from the weld zone 80 by the distance D, fluid does not normally flow into the gap G between the lower surface of the diaphragm 40 and the upper surface of the seat holder 78 falling within the distance D. However, repeated vertical motion during normal valve usage causes a change in the thickness of the diaphragm at the gripping portion 94 so that air-tightness of the gap G is lost and fluid enters the gap where it is caught and not easily removed. As a result, the fluid replacement or purging performance is lowered.

The valve shown in FIGS. 6 and 7 has a further disadvantage. Since the diaphragm 40 is gripped by the presser 82 and the seat holder 78 from above and below at the annular position 94, bending stress of the diaphragm is concentrated on one point of the gripping position 94 as the diaphragm moves up or down. As a result, the diaphragm cracks or is damaged in the vicinity of the gripping position as a result of metal fatigue due to repeated movements of the diaphragm over a period of time, this damage occurring earlier than in any other parts of the diaphragm. Thus, it is hard to extend the life of the diaphragm.

FIGS. 8 and 9 illustrate a metal diaphragm valve with a diaphragm seal structure as disclosed in Japanese Laid-open Patent 114265-1996. This valve includes a valve body 100, a valve chamber 100a, a valve seat 100b, fluid passages 100c, a bonnet 50, a valve seat 160, a bushing 51, a ball 52, a stem 53 and bonnet insert 54. In this arrangement a shaft 91a of a seat holder 91 is inserted through a mounting hole 93a of a diaphragm 93 and a center opening in a weld metal member 90.

The inner peripheral edge of the diaphragm 93 is disposed between an annular flat portion 90a formed on the lower surface of the weld metal member 90 and an annular flat portion 91b formed on the upper surface of the seat holder 91. The end portion of the inner peripheral edge of the diaphragm and the portions of the member 90 and the seat holder abutting the end portions of the inner peripheral edge of the diaphragm 93 are welded together at a weld zone W around the entire circumference of the inner peripheral edge of the diaphragm thereby integrally affixing the diaphragm, the seat holder and the weld metal member.

In the valve shown in FIGS. 8 and 9, bending stress is prevented from being applied to the weld zone W during operation of the diaphragm 93 because movement of the inner peripheral edge of the diaphragm immediately outward of the weld is limited or prevented by abutment of the diaphragm against the flat portion 90a of the lower surface of the weld metal member 90 and the flat portion 91b of the upper surface of the seat holder 91. This arrangement is designed to prevent the fluid being controlled from being caught in the gap between the inner peripheral edge of the diaphragm and the upper surface of the seat holder.

Since the inner peripheral edge of the diaphragm 93 lies between the annular flat portion 90a formed in the weld metal member 90 and the annular flat portion 91b formed in the seat holder 91, the gap Go formed between the lower surface of the diaphragm and the upper surface of the seat holder is smaller in depth as compared with the corresponding gap Go of the valve shown in FIGS. 6 and 7 although this difference is not obvious from the figures because of the small dimensions involved. As a result, fluid in the valve shown in FIGS. 8 and 9 is less likely to be caught in the gap Go.

Furthermore, since the inner peripheral edge of the diaphragm 93, weld metal member 90 and seat holder 91 are affixed and integrated by welding, the risk of leakage of fluid from the end portion of the inner peripheral edge of the diaphragm is much less than in the case of the valve shown in FIGS. 6 and 7 so the sealing performance is extremely high.

Also, since the inner peripheral edge of the diaphragm is confined between the flat portion 90a of the weld metal 90 and the flat portion 91b of the seat holder 91, if the screw of the shaft 91a is loosened so that the seat holder 91 slightly moves up or down, a large bending stress is not directly applied to the weld zone W of the diaphragm. Thus, cracks are less likely to be formed in the weld zone W of the diaphragm 93 as compared with the diaphragm 40 of FIG. 6.

In the valve shown in FIGS. 8 and 9, when the diaphragm 93 moves up or down, the bending stress in the diaphragm is concentrated in the region or outermost position 94 corresponding to the outward radial extent of the flat bottom surface 90a of the weld metal member 90 and the outward radial extent of the flat upper surface 91b of the seat holder 91. The flat surfaces support diaphragm 93 radially inwardly of position 94 but the diaphragm is free to bend outwardly of this position. As a result, when the diaphragm 93 is operated repeatedly, the part of the diaphragm in the vicinity of the position 94 suffers metal fatigue and cracks earlier than other parts of the diaphragm and it is hard to extend the life of the diaphragm.

In the valve shown in FIGS. 8 and 9, the spacing between the lower surface of the diaphragm 93 and the planar upper surface 91b of the seat holder 91 is extremely small, so any fluid accumulation in the gap G between these surfaces is minute. However, repeated vertical motion of the diaphragm during normal usage causes the thickness of the diaphragm to gradually decrease, and the volume of the gap G increases. This permits a greater volume of fluid to enter the small gap and the fluid replacement performance of the valve is lowered.

It should be noted that since the length dimension l (FIG. 9) of the upper flat surface portion 91b of the seat shoulder 91 is selected to be relatively large, a relatively large mass of fluid may enter the gap G and lowering of the fluid replacement performance is a more serious problem.

The valve illustrated in FIGS. 8 and 9 has a further disadvantage in that it requires a large number of parts such as ball 52, bushing 51, bonnet insert 54 and weld metal member 90. Assembly of these parts is complicated and difficult, and it requires much time and labor to complete its assembly.

SUMMARY OF THE INVENTION

An object of the present invention is to provide a metal diaphragm type valve having none of the disadvantages of the prior art described above yet requires fewer parts, less assembly time and is less expensive to manufacture.

Another object of the invention is to provide a metal diaphragm type valve having a seal structure which results in longer diaphragm life. According to this aspect of the invention, a seat holder, a diaphragm and a deflection limiter are welded together at the inner peripheral region surrounding a hole in the diaphragm. The deflection limiter has an annular flat surface facing the upper side of the diaphragm and the seat holder has an annular flat surface facing the bottom side of the diaphragm. The outer diameters of the annular flat surfaces are different so that bending stress are concentrated in a first or a second region of the diaphragm depending on the direction in which the diaphragm is flexed. This delays the onset of diaphragm cracking due to metal fatigue.

A further object of the invention is to provide a metal diaphragm type valve exhibiting excellent replacement or cleaning performance as compared to the prior art. According to this aspect of the invention, the deflection limiter, diaphragm and seat holder are welded together by a circumferential weld which provides an air-tight seal between the diaphragm and the annular flat surface of the seat holder, the weld extending to the outer circumference of the annular flat surface of the seat holder so that no crevice exists between the diaphragm and annular flat surface in which fluid may be trapped.

Other objects and advantages of the invention will become obvious upon consideration of the following description and the accompanying drawings.

DESCRIPTION OF PREFERRED EMBODIMENTS

Figure 1:
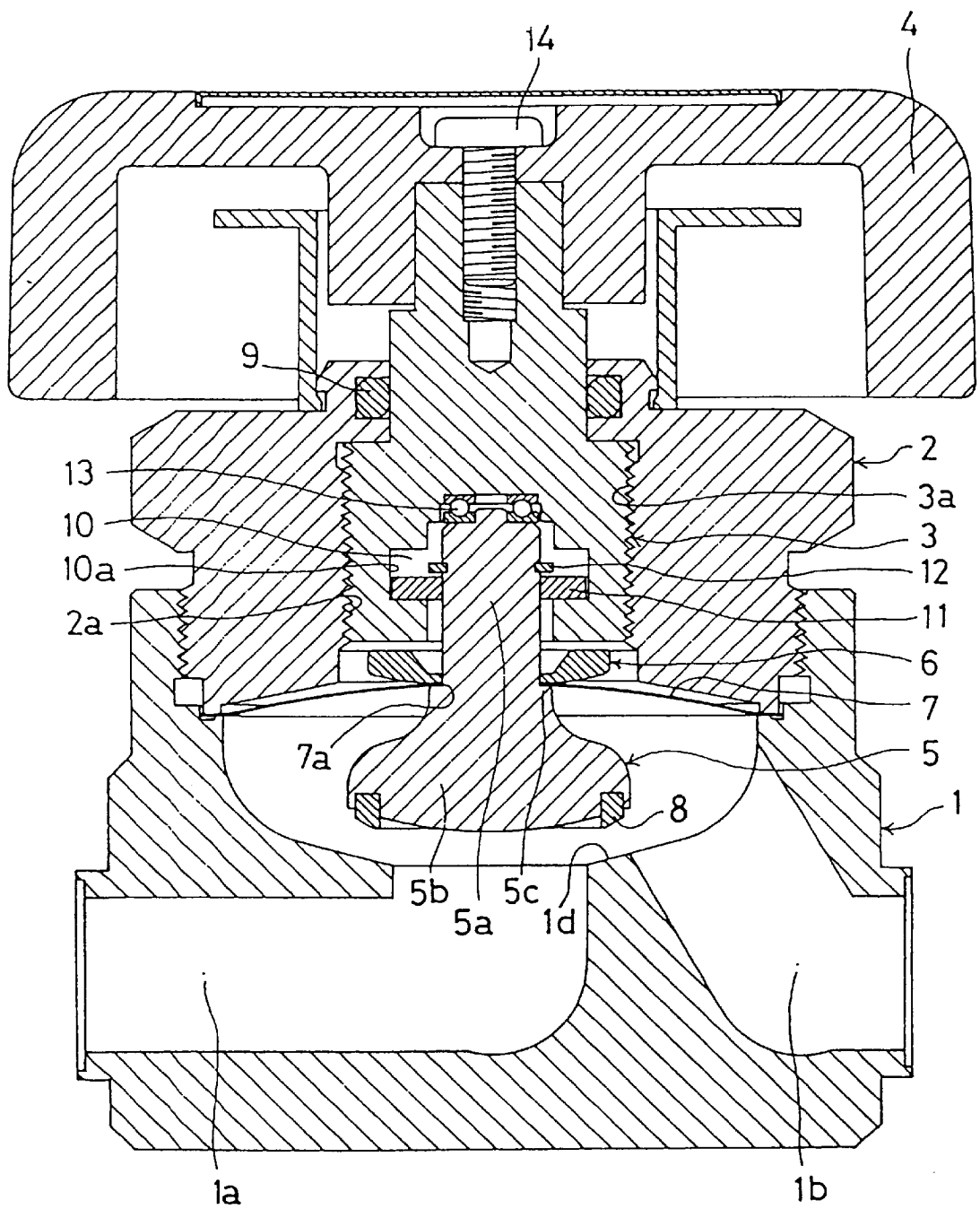
FIG. 1 is a longitudinal sectional view showing an example of a metal diaphragm type valve according to the invention.

FIG. 1 is a longitudinal sectional view of a metal diaphragm type valve employing a seal structure according to a first embodiment of the invention wherein the inner peripheral edge of a metal diaphragm 7, the inner peripheral edge of a deflection limiter 6, and a seat holder 5 are integrally affixed by welding. The weld eliminates the requirement of any mechanism for clamping (gripping) of the inner peripheral edge of the diaphragm, as used in the prior art.

The metal diaphragm valve comprises a body 1 having a fluid inlet passage 1a, a fluid outlet passage 1b, a valve chamber 1c, and a valve seat 1d. A bonnet nut 2 is screwed into the body 1 and a stem 3 is screwed into and supported for vertical movement, by the bonnet nut. A handle 4 is attached to the upper end of the stem 3 and a seat holder 5 is attached to the lower end of the stem so as to move vertically therewith. A deflection limiter 6 has a central opening and the upwardly projecting support shaft 5a of a seat holder 5 extends through the opening. The deflection limiter 6 rests on the diaphragm which in turn rests on a shoulder or support step 5c provided on the lower portion of the shaft 5a. The metal diaphragm 7 has an outer peripheral edge gripped and supported between the body 1 and the bonnet nut 2 as the bonnet nut is screwed into the body. The inner peripheral edge of the diaphragm is welded to the seat holder 5 and deflection limiter 6.

The stem 3 is made of stainless steel (SS316) in a nearly columnar form, and an engaging recess 10, having an expanded middle portion 10a, is formed in the lower part of the stem.

Screw threads 3a are formed on the outer circumference of the stem 3, and engage screw threads 2a formed on the interior of bonnet nut 2 so that the stem 3 is supported elevatably in the bonnet nut. The stem 3 may be raised or lowered by rotating the stem relative to the bonnet nut. The handle 4 is attached to the stem by a screw 14 so that rotation of the handle raises or lowers the stem relative to the bonnet nut.

An O-ring 9 is provided to prevent contaminants from entering the valve between the bonnet nut 2 and the stem 3.

Figure 3:
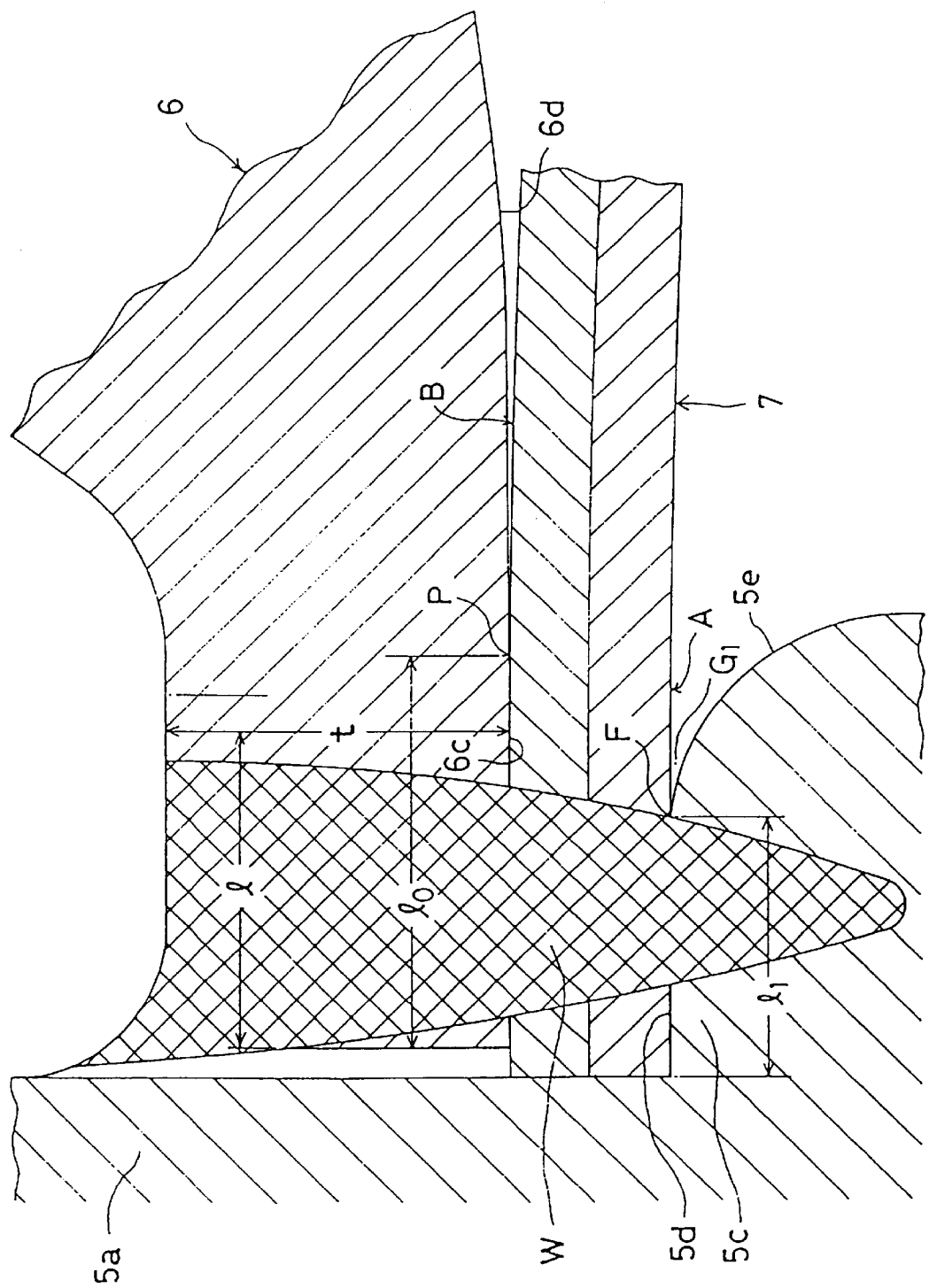
FIG. 3 is a magnified partial longitudinal sectional view of an inner peripheral edge of the metal diaphragm shown in FIG. 1.

The seat holder 5 is made of metal such as stainless steel (SS316L) and has, in addition to the upwardly projecting cylindrical support shaft 5a, an expanded lower part 5b. The support step 5c for supporting the diaphragm is formed at the boundary of the columnar support shaft 5a and the lower part 5b. The diaphragm support step comprises a flat annular surface portion 5d and a smooth arcuate shoulder 5e formed continuously therewith, as shown in FIG. 3.

A seat insert (seat) 8, made of a polymer or synthetic resin or metal, is provided at the lower end of the lower part 5b.

The upper part of the support shaft 5a is inserted into engaging recess 10 of the stem 3, and a washer 11 and a retaining ring 12 secure the support shaft 5a within the expanded portion 10a of the recess while permitting relative rotation between the shaft and the stem. A bearing 13 may be provided between the upper surface of support shaft 5a and the upper end surface of recess 10 to reduce friction between the stem 3 and the support shaft. This bearing may be omitted in some cases.

Figure 2:
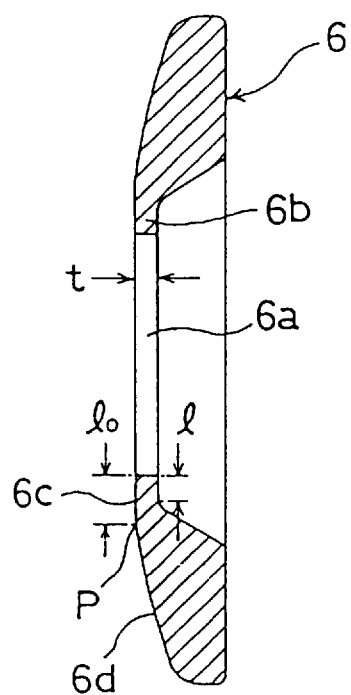
FIG. 2 is a longitudinal sectional view showing an example of a deflection limiter used in the invention.

The deflection limiter 6 (FIG. 2) is made of metal such as stainless steel (SS304L) in a circular dish form. An insertion hole 6a is provided in the center of the deflection limiter and the support shaft 5a (FIG. 1) of the seat holder 5 extends through the insertion hole.

The inner peripheral edge 6b of the deflection limiter 6 is formed with a thickness t of about 2 mm. The length l of the peripheral edge 6b having the thickness t defines a weld zone W (FIG. 3) where the deflection limiter is welded to the upper surface of the metal diaphragm.

The lower side of the deflection limiter (left side as viewed in FIG. 2) has a flat annular surface portion 6c of length $l_0$ larger than or nearly as large as, the length l. A moderate curvature 6d extends upwardly and continuously from the outer end P of the flat portion 6c to the outer periphery of the deflection limiter.

The metal diaphragm 7 is formed by overlaying a plurality of (two or three) ultrathin metal plates (thickness: about 0.1 to 0.2 mm) in a dish form. The plates may be made of stainless steel (SS316L), a Co-Ni alloy steel such as Elgiloy™, or the like. Elgiloy™ contains C=0.15, Mn=1.5 to 2.5, Ni=14 to 16, Cr=19 to 21, Mo=6 to 8, Be=0.1 or less, Co=39–41, and Fe=remainder (all contents by wt. %). A mounting hole 7a is provided at the center of the diaphragm for receiving the shaft 5a of the seat holder 5. In this embodiment, the outer diameter of the diaphragm 7 is selected to be about 38 mm.

The inner peripheral edge of the metal diaphragm 7 is, as shown in FIG. 3, positioned between the flat annular surface portion 6c of the deflection limiter 6, and the flat annular surface portion 5d of the diaphragm support step 5c on the seat holder 5, and is welded to both the limiter and the support step.

As shown in FIG. 3, the inner peripheral edge of the diaphragm 7, the flat portion 6c of the deflection limiter 6 abutting against the inner peripheral edge of the diaphragm 7, and the flat portion 5d of the seat holder abutting the inner peripheral edge of the diaphragm 7 are welded together by a weld W. The weld is in ring form, extending around the whole circumference of the deflection limiter 6 in the portion of length l. This integrally affixes, in an airtight manner, the inner peripheral edge of the diaphragm 7, the inner peripheral edge of the deflection limiter 6, and the flat portion 5d of the seat holder 5.

Referring to FIGS. 1 and 3, the valve operates in the following manner. When the stem 3 is moved up or down by rotating the handle 4, the seat holder 5 ascends or descends, and the seat 8 contacts the valve seat id or departs from the valve seat and the fluid passage 1a is opened or closed so that fluid may flow between passages 1a and 1b.

When the fluid passage 1a of the valve is open, the metal diaphragm 7 returns to an initial state of upward curvature as shown in FIG. 1, and almost no bending stress is applied to the inner peripheral edge of the diaphragm. If, however, the diaphragm 7 is pulled up at a time the valve is opened, a downward bending stress is applied to the inner peripheral edge of the diaphragm so that the diaphragm tends to bend downwardly radially outwardly of the support step 5c. The resulting curved portion of the diaphragm is supported by the arcuate shoulder 5e on the seat holder 5. That is, the lower surface of the diaphragm in the region A (FIG. 3) contacts and is supported by the shoulder 5e.

On the other hand, when the valve is operated to close the fluid passage 1a, an upward bending stress is applied to the inner peripheral edge of the diaphragm. In this case, the upper surface of the diaphragm in the region B contacts and is supported by the curvature 6d of the deflection limiter 6.

Thus, in the diaphragm valve of the invention, unlike the conventional metal diaphragm type valve, the inner peripheral edge of the diaphragm 7 is not clamped. Instead, the inner peripheral edge of the diaphragm is supported by the curvature 6d of the deflection limiter 6 or the arcuate curvature 5e of the seat holder 5 when the diaphragm is bent. Accordingly, bending stress is not directly applied to the weld zone W. As a result, cracks and the like are not formed in the weld zone.

It should be noted that upon upward bending of the diaphragm the bending begins at a point P where the flat surface 6c of the deflection limiter joins the curved surface 6d, but upon downward bending the diaphragm bends about point F where the flat portion 5d of the seat holder joins the arcuate surface 5e. Points P and F are located at different distances ($l_0$ and $l_1$) from the seat support shaft 5a in the radial direction because the diameter of the flat annular surface 6c of the deflection limiter is different from the diameter of the flat annular surface 5d on the seat holder. Thus, the diaphragm 7 bends at two different positions A and B (FIG. 3) as compared to the conventional case where bending occurs at the clamped portion only regardless of the direction in which the diaphragm is flexed. Thus, the life or durability of the diaphragm is improved substantially.

Moreover, since the weld zone W covers almost the whole area of the flat portion 5d of the diaphragm support step 5c as shown in FIG. 3, there is a gap $G_1$ outward of where the weld W joins the diaphragm and the support step 5c and the lower side of the diaphragm 7. This greatly enhances the fluid replacement performance and the purging of waste gases from the valve.

In addition, since the inner peripheral edge of the diaphragm 7, the deflection limiter 6, and the seat holder 5 are integrally affixed in an airtight manner, the fluid in the valve chamber 1c will never leak out from the inner peripheral edge portion of the diaphragm and the sealing performance is extremely high.

Figure 4:
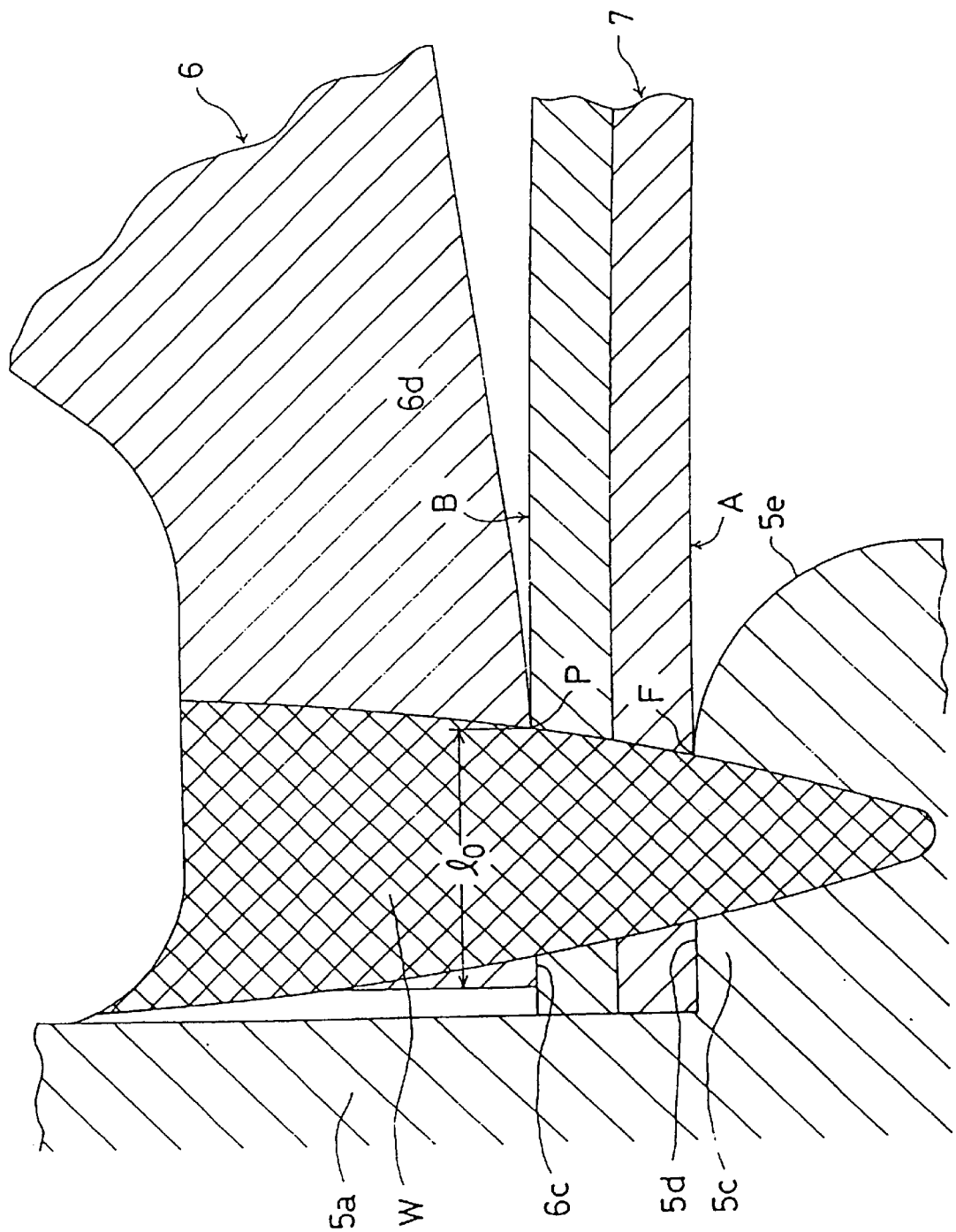
FIG. 4 is a magnified partial longitudinal sectional view of an inner peripheral edge of a metal diaphragm of a valve according to a second embodiment of the invention.

FIG. 4 is a magnified partial view showing a second embodiment of the invention. In this embodiment, the length $l_0$ of the flat portion 6c at the lower side of the deflection limiter 6 is made shorter than in the case of FIG. 3 so that the bending region A at the lower side of the diaphragm and the bending region B at the upper side of the diaphragm during operation of the diaphragm 7 are closer to each other as compared to the embodiment of FIG. 3. Although this tends to reduce the advantage of distributing stresses in the diaphragm depending on the direction it is flexed, this arrangement tends to make more equal the support provided to the diaphragm by the seat holder and the deflection limiter.

Figure 5:
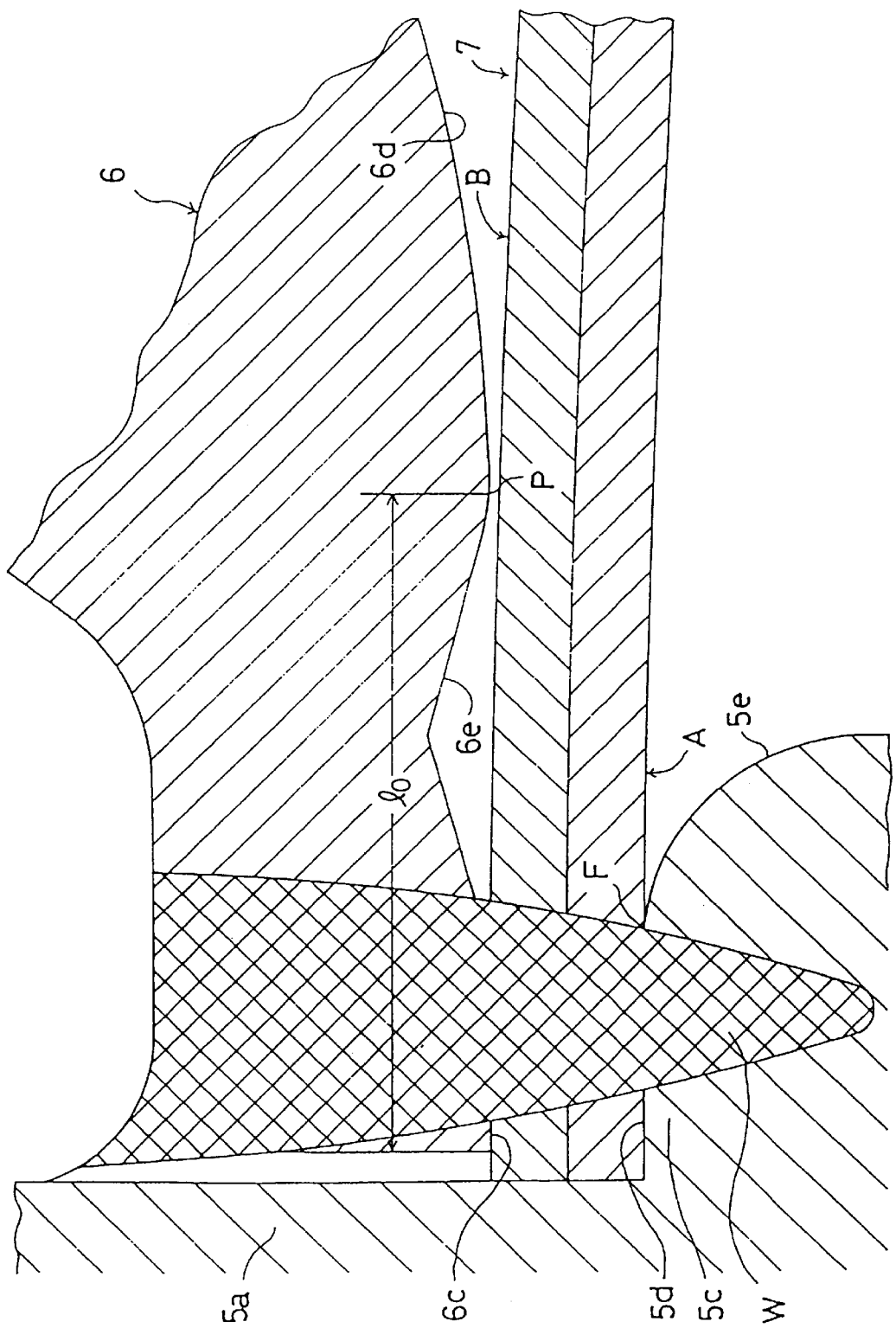
FIG. 5 is a magnified partial longitudinal sectional view of an inner peripheral edge of a metal diaphragm of a valve according to a third embodiment of the invention.
Figure 6:
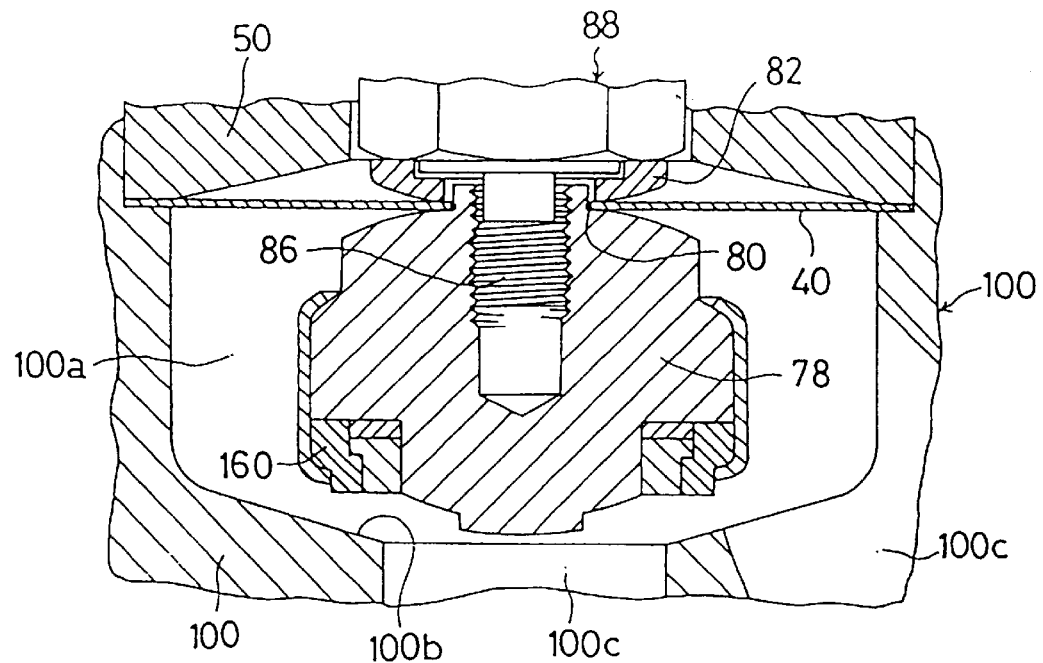
FIG. 6 is a partial longitudinal sectional view of a prior art valve as disclosed in U.S. Pat. No. 4,750,709.
Figure 7:
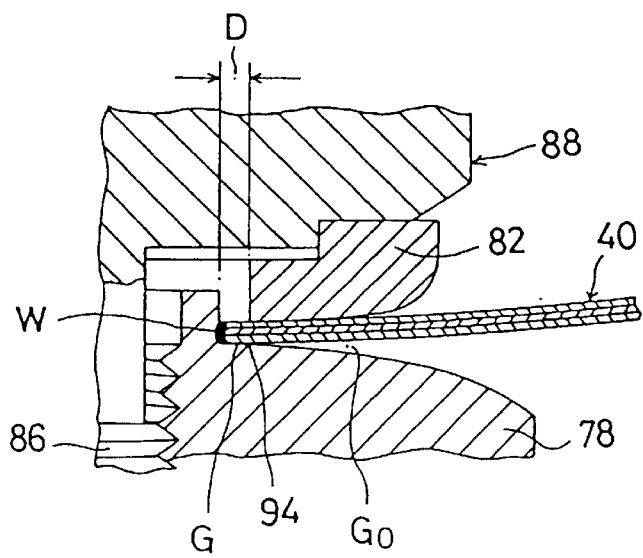
FIG. 7 is a magnified partial longitudinal sectional view of an inner peripheral edge of the metal diaphragm shown in FIG. 6.
Figure 8:
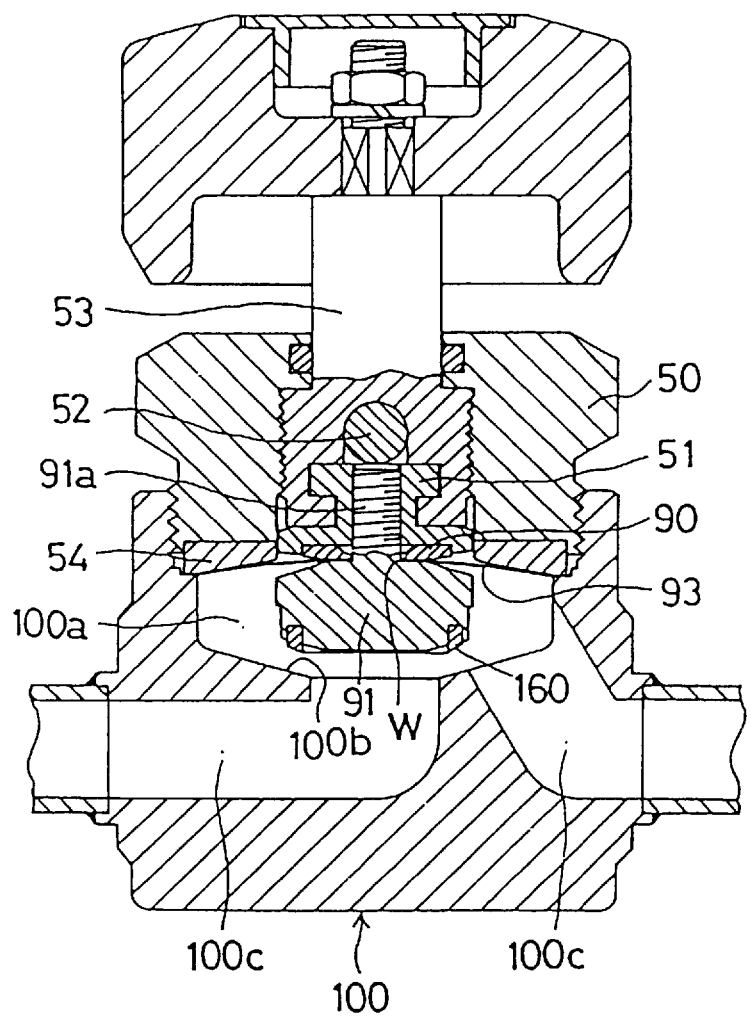
FIG. 8 is a longitudinal sectional view of a prior art valve as disclosed in Japanese Laid-open Patent 114265-1996; and, FIG. 9 is a magnified partial longitudinal sectional view of an inner peripheral edge of the metal diaphragm shown in FIG. 8.
Figure 9:
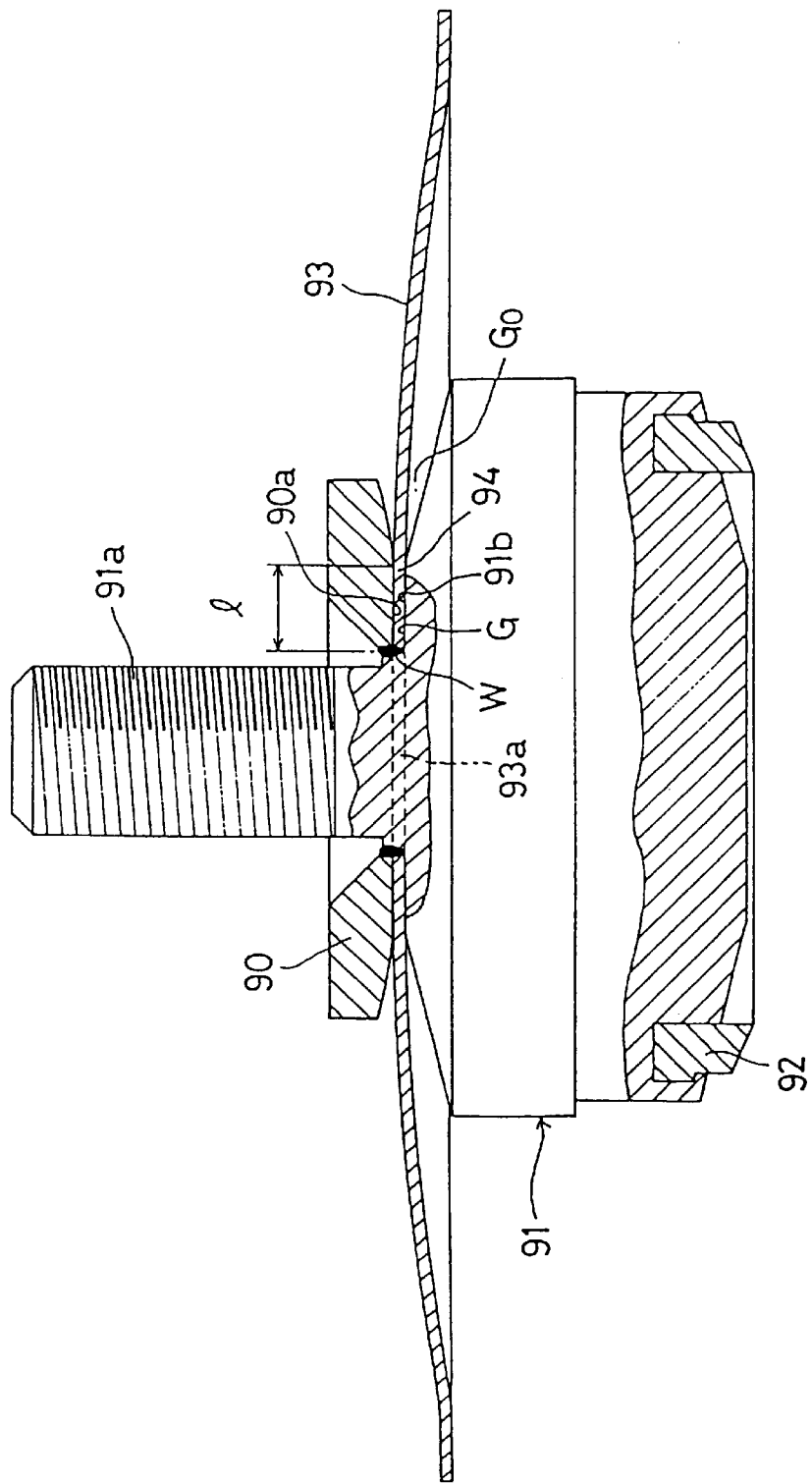

FIG. 5 is a partial magnified view showing essential parts of the metal diaphragm type valve according to a third embodiment of the invention. In this embodiment, the length $l_0$ of the flat portion 6c at the lower side of the deflection limiter 6 is selected longer than in the case of the first embodiment (FIG. 3), and a recess 6e is formed in the flat portion 6c, so that a portion in the region of recess 6e does not contact the diaphragm 7.

In the embodiment of FIG. 5, the space between the bending region A at the lower side and the bending region B at the upper side during operation of the diaphragm 7 is wider, so that the life span of the diaphragm is further increased.

An opening and closing durability test was conducted on a valve constructed according to the first embodiment described above. The diaphragm comprised two pieces of Elgiloy™ having an outer diameter of 38 mm and a thickness of 0.1 to 0.2 mm. The fluid pressure of the fluid being controlled was 375 psi. The valve was cycled (opened and closed) at a rate of once/sec and the diaphragm did not crack or fail after 16470 cycles.

By contrast, the life of a conventional metal diaphragm type valve is about 3000 cycles.

In the metal diaphragm valve of the invention, the bending stress applied to the inner peripheral edge of the diaphragm 7 when the valve is closed is mainly supported at the lower side 6d of the deflection limiter 6, and the bending stress applied to the inner peripheral edge when the valve is opened is mainly supported at the arcuate shoulder 5e of the diaphragm support step 5c. As a result, bending stress is not directly applied to the weld zone W of the inner peripheral edge of the diaphragm, and cracks or the like do not form in the weld zone W.

Furthermore, the bending stress receiving regions of the diaphragm 7 (the regions A and B) differ and are spaced from each other in the radial direction so that, depending on whether the valve is opened or closed, the bending stress is dispersed in two regions. Hence, as compared with the conventional case of where the metal diaphragm 7 is clamped from above and below at one position, breakage of the diaphragm is less likely to occur.

Moreover, as compared with the conventional case where coupling of the seat holder and shaft is accomplished by a screw mechanism clamping the diaphragm at one position, the number of parts for forming the valve is smaller, and assembly of the valve is much easier.

In addition, since the gap $G_1$ between the lower side of the metal diaphragm 7 and the upper side of the seat holder 5 is not formed by a structure for clamping the diaphragm, the gap is almost nil and very little fluid is caught therein. As a result, the fluid replacement performance and the cleaning/purging performance of the inside of the valve are extremely enhanced.

Although specific preferred embodiments have been described to illustrate the novel aspects of the invention, it will be obvious that various additions and modifications may be made in the described embodiments without departing from the spirit and scope of the invention as defined by the appended claims.

We claim:

1. In a metal diaphragm type valve, the combination comprising: a flexible metal diaphragm having a center opening; means for clamping the diaphragm at an outer circumferential portion thereof; a valve seat holder movable vertically to flex said diaphragm, said valve seat holder having a shaft portion extending upwardly through the center openings in the diaphragm and the deflection limiter; and, a weld securing said diaphragm to said deflection limiter and said valve holder, wherein said valve seat holder comprises a diaphragm support step, said support step having a flat annular upper surface engaging a bottom surface of said diaphragm and an arcuate surface joining said flat upper surface for supporting said diaphragm when a center portion of said diaphragm is flexed upwardly; wherein said deflection limiter comprises a flat annular bottom surface engaging a top surface of said diaphragm and a curved surface joining said flat bottom surface for supporting said diaphragm when the center portion of said diaphragm is flexed downwardly; and wherein said annular upper surface and said annular bottom surface having respective different outside diameters causing bending stresses in said diaphragm at first and second regions depending on whether the center of said diaphragm is flexed upwardly or downwardly.

2. The combination of claim 1 wherein said weld is an annular weld securing said diaphragm to said valve seat holder at at least an outer circumferential region of said annular top surface.

3. A metal diaphragm type valve comprising a body having a fluid inlet passage, a fluid outlet passage, a valve chamber, and a valve seat; a stem disposed in said body and freely movable vertically therein; a seat holder having a support shaft, said seat holder being coupled to a lower part of said stem; and a metal diaphragm disposed at an upper portion of said valve chamber so as to seal airtight an upward opening of the valve chamber, said diaphragm being penetrated by the support shaft of said seat holder, wherein a diaphragm support step having on an upper surface thereof an annular flat portion and an arcuate shoulder, formed continuously with said flat portion, is provided in the seat holder, the diaphragm having an inner peripheral edge surrounding a central mounting hole through which the support shaft extends, said inner peripheral edge resting on the flat portion of the diaphragm support step; and a deflection limiter of a reverse dish shape which the support shaft penetrates, said deflection limiter being disposed on the inner peripheral edge of the metal diaphragm, said deflection limiter having an annular thin flat portion of thickness t abutting against an upper surface of the inner peripheral edge of the metal diaphragm and a curved portion formed continuously with said flat portion, wherein the position of an outward end portion of the flat portion of the deflection limiter is located outward of the position of an outward end portion of the flat portion of the diaphragm support step, and wherein the flat portion of the deflection limiter, the inner peripheral edge of the metal diaphragm, and the flat portion of the diaphragm support step being welded by a circumferential weld so that the diaphragm, deflection limiter and said holder are integrally affixed to form an air-tight seal.

4. The metal diaphragm type valve of claim 1, wherein a recess is formed in the flat portion at the lower side of the deflection limiter.

5. A metal diaphragm type valve comprising a body having a fluid inlet passage, a fluid outlet passage, a valve chamber, and a valve seat; a stem threaded to be movable vertically in a threaded bonnet nut disposed in said body and freely movable vertically therein, the bonnet nut being screwed into the body; a seat holder having a support shaft, said seat holder being coupled to a lower part of said stem; and a metal diaphragm disposed at an upper portion of said valve chamber so as to seal airtight an upward opening of the valve chamber, said diaphragm being penetrated by the support shaft of said seat holder, wherein a diaphragm support step having on an upper surface thereof an annular flat portion and an arcuate shoulder, formed continuously with said flat portion, is provided in the seat holder, wherein an engaging recess having an expanded portion in the middle is disposed in the stem, and an upward portion of the support shaft of the seat holder is rotatably fixed within the recess, and wherein a bearing is disposed between an upper end of the support shaft of the holder and an upper end surface of a recess provided in said stem, the diaphragm having an inner peripheral edge surrounding a central mounting hole through which the support shaft extends, said inner peripheral edge resting on the flat portion of the diaphragm support step; and a deflection limiter of a reverse dish shape which the support shaft penetrates, said deflection limiter being disposed on the inner peripheral edge of the metal diaphragm, said deflection limiter having an annular thin flat portion of thickness t abutting against an upper surface of the inner peripheral edge of the metal diaphragm and a curved portion formed continuously with said flat portion, wherein the position of an outward end portion of the flat portion of the deflection limiter is located outward of the position of an outward end portion of the flat portion of the diaphragm support step, and wherein the flat portion of the deflection limiter, the inner peripheral edge of the metal diaphragm, and the flat portion of the diaphragm support step being welded by a circumferential weld so that the diaphragm, deflection limiter and said holder are integrally affixed to form an air-tight seal.

* * * * *